US010189422B2

(12) United States Patent
Adachi et al.

(10) Patent No.: US 10,189,422 B2
(45) Date of Patent: Jan. 29, 2019

(54) WIRE HARNESS

(71) Applicant: YAZAKI CORPORATION, Tokyo (JP)

(72) Inventors: Hideomi Adachi, Shizuoka (JP); Hidehiko Kuboshima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/465,008

(22) Filed: Mar. 21, 2017

(65) Prior Publication Data

US 2017/0274843 A1 Sep. 28, 2017

(30) Foreign Application Priority Data

Mar. 22, 2016 (JP) .................. 2016-056409

(51) Int. Cl.
*H01R 4/70* (2006.01)
*H01R 4/20* (2006.01)
(Continued)

(52) U.S. Cl.
CPC ........... *B60R 16/0215* (2013.01); *H01R 4/70* (2013.01); *H01R 4/20* (2013.01); *H01R 4/62* (2013.01)

(58) Field of Classification Search
CPC ........ B60R 16/0215; H01R 4/70; H01R 4/20; H01R 4/62
(Continued)

(56) References Cited

U.S. PATENT DOCUMENTS 2,956,109 A * 10/1960 Greco .................... H02G 15/18
174/138 F
3,138,657 A * 6/1964 Wengen ................. H02G 15/18
174/5 R
(Continued)

FOREIGN PATENT DOCUMENTS

CN 104471651 A 3/2015
JP 2-108253 U 8/1990
(Continued)

OTHER PUBLICATIONS

Japanese Office Action for the related Japanese Patent Application No. 2016-056409 dated Aug. 21, 2018.
(Continued)

*Primary Examiner* — Timothy Thompson
*Assistant Examiner* — Michael F McAllister
(74) *Attorney, Agent, or Firm* — Kenealy Vaidya LLP (57) ABSTRACT

A wire harness which electrically connects high-voltage devices includes a conductive path that is used as a trunk cable, a branch cable that branches from the trunk cable, and a branch connecting portion which connects the trunk cable with the branch cable, wherein the trunk cable has a trunk cable-side conductor exposed portion where a cover of the trunk cable lying in a predetermined position of the trunk cable is removed, the branch cable has a branch cable-side conductor exposed portion where a cover of the branch cable lying a predetermined position of the branch cable is removed, the trunk cable-side conductor exposed portion is connected with the branch cable-side conductor exposed portion at the branch connecting portion, and the branch connecting portion has an insulating and waterproofing portion which functions as an insulating portion and a waterproofing portion.

9 Claims, 10 Drawing Sheets

(51) Int. Cl.
*H01R 4/62* (2006.01)
*B60R 16/02* (2006.01)

(58) Field of Classification Search
USPC .......................................... 174/113 F, 72 A
See application file for complete search history.

(56) References Cited

U.S. PATENT DOCUMENTS

| | | | | |
|---|---|---|---|---|
| 3,715,459 | A * | 2/1973 | Hoffman | H02G 15/113 |
| | | | | 174/138 F |
| 4,176,245 | A * | 11/1979 | Merlack | H02G 15/18 |
| | | | | 174/92 |
| 4,451,696 | A * | 5/1984 | Beinhaur | H01R 4/64 |
| | | | | 174/76 |
| 5,021,611 | A | 6/1991 | Amano | |
| 5,168,124 | A * | 12/1992 | Takase | H01R 4/70 |
| | | | | 174/23 R |
| 5,594,210 | A * | 1/1997 | Yabe | H01R 4/70 |
| | | | | 174/76 |
| 7,950,956 | B2 * | 5/2011 | Hiner | H01R 4/70 |
| | | | | 174/138 F |
| 8,236,720 | B2 * | 8/2012 | Petritz | B22D 41/02 |
| | | | | 106/690 |
| 8,637,774 | B2 * | 1/2014 | Hiner | H01R 4/70 |
| | | | | 174/138 F |
| 9,236,720 | B2 * | 1/2016 | Ichikawa | B60R 16/0215 |
| 2014/0262495 | A1 | 9/2014 | Oga et al. | |
| 2015/0096786 | A1 * | 4/2015 | Takasu | B32B 7/02 |
| | | | | 174/145 |
| 2015/0107871 | A1 | 4/2015 | Adachi et al. | |
| 2015/0114711 | A1 | 4/2015 | Dew et al. | |
| 2015/0136482 | A1 | 5/2015 | Adachi et al. | |
| 2015/0207258 | A1 | 7/2015 | Moriuchi | |
| 2015/0229115 | A1 | 8/2015 | George et al. | |
| 2016/0260523 | A1 * | 9/2016 | Aragiri | B60R 16/0215 |
| 2016/0344176 | A1 | 11/2016 | Dew et al. | |
| 2017/0246998 | A1 | 8/2017 | Ogue et al. | |

FOREIGN PATENT DOCUMENTS

| | | |
|---|---|---|
| JP | 2013-115976 A | 6/2013 |
| JP | 2014-42443 A | 3/2014 |
| JP | 2015-133822 A | 7/2015 |
| JP | 2015-139254 A | 7/2015 |
| JP | 2016-503559 A | 2/2016 |
| JP | 2017-152229 A | 8/2017 |

OTHER PUBLICATIONS

Chinese Office Action for the related Chinese Patent Application No. 201710174520.8 dated Aug. 20, 2018.
French Search Report for the related French Patent Application No. 1752374 dated Sep. 6, 2018.
Japanese Office Action for the related Japanese Patent Application No. 2016-056409 dated Nov. 6, 2018.

* cited by examiner

WIRE HARNESS

CROSS REFERENCE TO RELATED APPLICATION

This application is based on Japanese Patent Application No. 2016-056409 filed on Mar. 22, 2016, the contents of which are incorporated herein by reference.

BACKGROUND

1. Technical Field

The present invention relates to a wire harness which includes a conductive path and which connects electrically high-voltage devices.

2. Background Art

For example, JP-A-2014-042443 below discloses a wire harness as a conventional wire harness which connects electrically high-voltage devices (accessories) which are mounted on a hybrid electric vehicle or an electric vehicle.

The wire harness includes one or a plurality of conductive paths, an external member which accommodates and protects the conductive paths, external connecting devices which are provided at ends of the wire harness for connection with exterior high voltage devices provided on the vehicle and a plurality of fixing members for attaching and fixing the wire harness to a fixing target object.

In the conventional wire harness described above, devices (accessories) which constitute connecting target objects are an inverter unit in an engine compartment and a battery in a rear portion of the motor vehicle. The inventor of this patent application considers that an electrical connection newly can be made to an alternative device (accessories), in addition to the two devices described above, by the wire harness. Then, the inventor has studied about a construction in which the conductive path is extended from a harness end of the wire harness which is disposed in the engine compartment to the alternative device. However, the resulting construction is such that the conductive path is laid out in such a way as to be turned back like taking, as it were, a U-turn, resulting in a problem that the laying-out work becomes complex and troublesome. In addition, extending the conductive path from the harness end to the further device is not always the shortest way. The conductive path becomes longer by such an extent that the conductive path is extended by only a share having done the U-turn, as a result of which a problem is caused that the production cost of the wire harness is increased.

The invention has been made in view of the situations described above, and an object of the invention is to provide a wire harness which can realize an improvement connecting work of connecting the wire harness with devices and a reduction in cost involved in producing the wire harness.

SUMMARY

[1] According to an aspect of the invention, a wire harness which electrically connects high-voltage devices includes a conductive path that is used as a trunk cable, a branch cable that branches from the trunk cable, and a branch connecting portion which connects the trunk cable with the branch cable, wherein the trunk cable has a trunk cable-side conductor exposed portion where a cover of the trunk cable lying in a predetermined position of the trunk cable is removed, the branch cable has a branch cable-side conductor exposed portion where a cover of the branch cable lying a predetermined position of the branch cable is removed, the trunk cable-side conductor exposed portion is connected with the branch cable-side conductor exposed portion at the branch connecting portion, and the branch connecting portion has an insulating and waterproofing portion which functions as an insulating portion and a waterproofing portion.

[2] In the wire harness of [1], a shielding member is provided further which covers the insulating and waterproofing portion to shield the portion.

[3] In the wire harness of [2], a protector is provided further which accommodates the insulating and waterproofing portion which is covered by the shielding portion.

[4] In the wire harness of any one of [1] to [3], part or the whole of the insulating and waterproofing portion is formed of a resin mold.

According to the wire harness described above, the wire harness is provided which has the construction in which the conductive path is used as the trunk cable and the branch cable is connected to the halfway portion along the length of the conductive path which is the trunk cable. Then, the insulating and waterproofing portion is provided at the connecting portion (the branch connecting portion) where the conductive path as the trunk cable and the branch cable are connected together to insulate and waterproof e connecting portion, whereby even with the high-voltage wire harness, is caused no problem in relation to the branching of the branch cable from the trunk cable. In addition, according to the invention, the part or the whole of the insulating and waterproofing portion is formed of the resin mold, and this causes the branch connecting portion to be embedded in the resin mold, as a result of which the insulating and waterproofing properties are, of course, improved. In addition, according to the invention, the shielding member is provided further, and the insulating and waterproofing portion can be covered by the shielding member to thereby be shielded from the outside. Additionally the protector is provided further so as to accommodate therein the insulating and waterproofing portion which is covered by the shielding member, whereby the insulating and waterproofing portion is protected further from the outside. Using the protector, of course, makes it easy to lay out the wire harness even though the branching portion is provided on the wire harness. The invention is preferably applied to a long wire harness which is laid out so as to extend long underneath a floor of a vehicle, for example.

With the wire harness since the wire harness is provided in which the branch cable extends outwards from the halfway portion thereof, the wire harness of the invention is nothing like the wire harness in which the conductive path is turned back like taking, as it were, the U-turn from the ends of the wire harness, and the branch cable does not have to extend longer than a required minimum. Consequently, according to the invention, there is provided an advantageous effect that the connecting work of connecting the wire harness with devices (accessories) can be improved and the cost involved in producing the wire harness can be reduced. Then, providing the wire harness of the invention results in an advantageous effect that not only can devices (accessories) positioned at the ends of the wire harness electrically be connected but also a further device (accessory) can electrically be connected.

With the wire harness [2], in addition to advantageous effects provided by the wire harness [1], the shielding properties can be given to the branch connecting portion from which the branch cable branches.

With the wire harness [3], in addition to the advantageous effect provided by the wire harness [2], even with the wire harness with the branch cable extending therefrom, the wire harness can easily and simply be fixed to the fixing target object via the protector by accommodating the insulating and waterproofing portion which is covered by the shielding member in the protector. This provides an advantageous effect that the working performance in relation to laying out the wire harness can be improved.

With the wire harness [4], in addition to the advantageous effect provided by any one of the wire harnesses [1] to [3], the part or the whole of the insulating and waterproofing portion is formed of the resin mold, as a result of which the branch connecting portion is embedded in the resin mold, resulting in an advantageous effect that the insulating and waterproofing properties can be unproved.

BRIEF DESCRIPTION OF THE DRAWINGS

FIGS. 5A to 5C show sectional views of FIG. 4, in which

FIGS. 6A and 6B show perspective views of the branch connecting portions and the insulating and waterproofing portion, of which

FIGS. 9A to 9C show several views of the branch connecting portions and the insulating and waterproofing portion, in which

FIGS. 10A to 10C show several views of branch connecting portions and the insulating and waterproofing portion, in which

DETAILED DESCRIPTION OF EMBODIMENTS

A wire harness has a conductive path and is used to connect electrically high-voltage devices, and the conductive path is used as a trunk cable. Then, a branch cable is connected to a halfway or certain position along the length of the conductive path which is the trunk cable. Covers lying in predetermined positions of the trunk cable and the branch cable are removed so as to form a trunk cable-side conductor exposed portion and a branch cable-side conductor exposed portion connecting the trunk cable-side conductor exposed portion and the branch cable-side conductor exposed portion together forms a branch connecting portion. An insulating and waterproofing portion is provided on the branch connecting portion to insulate and waterproof the branch connecting portion.

Embodiment 1

Figure 1:
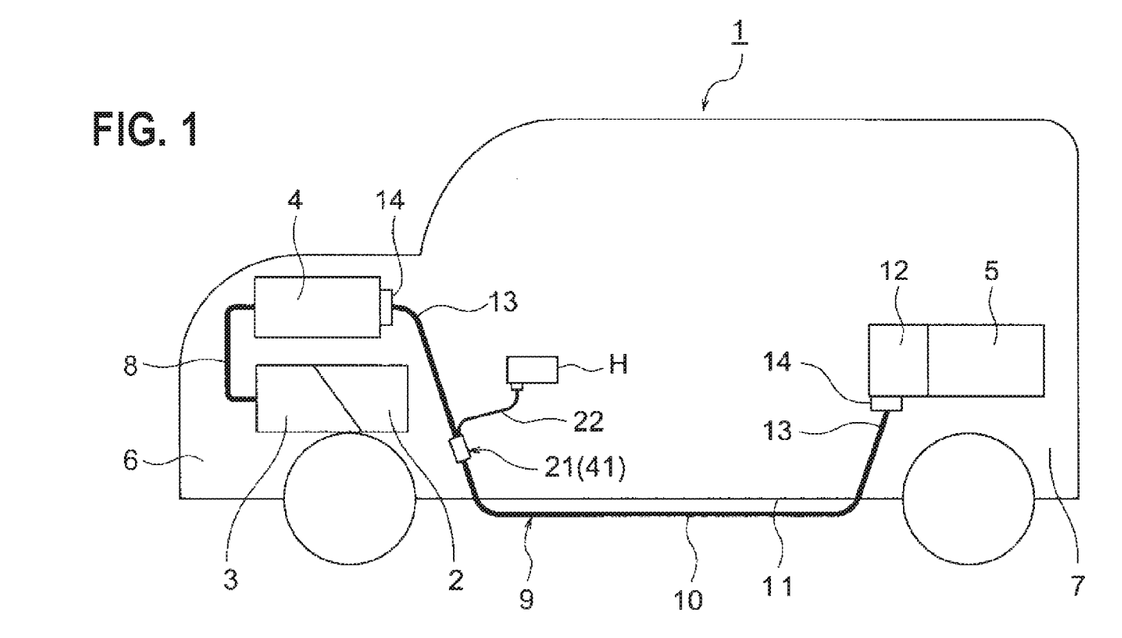
FIG. 1 is a schematic drawing illustrating a state where a wire harness of the invention is laid out on a vehicle (Embodiment 1).
Figure 2:
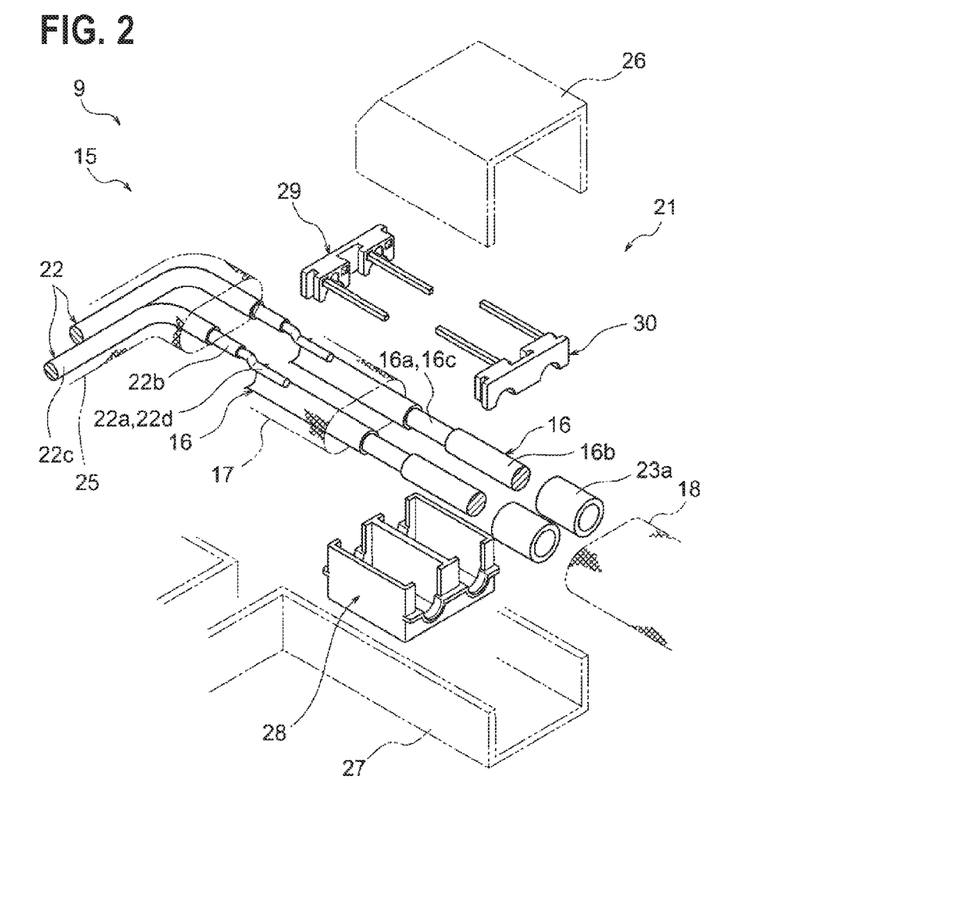
FIG. 2 is an exploded perspective view of a branching structure main body shown in FIG. 1 (Embodiment 1).
Figure 3:
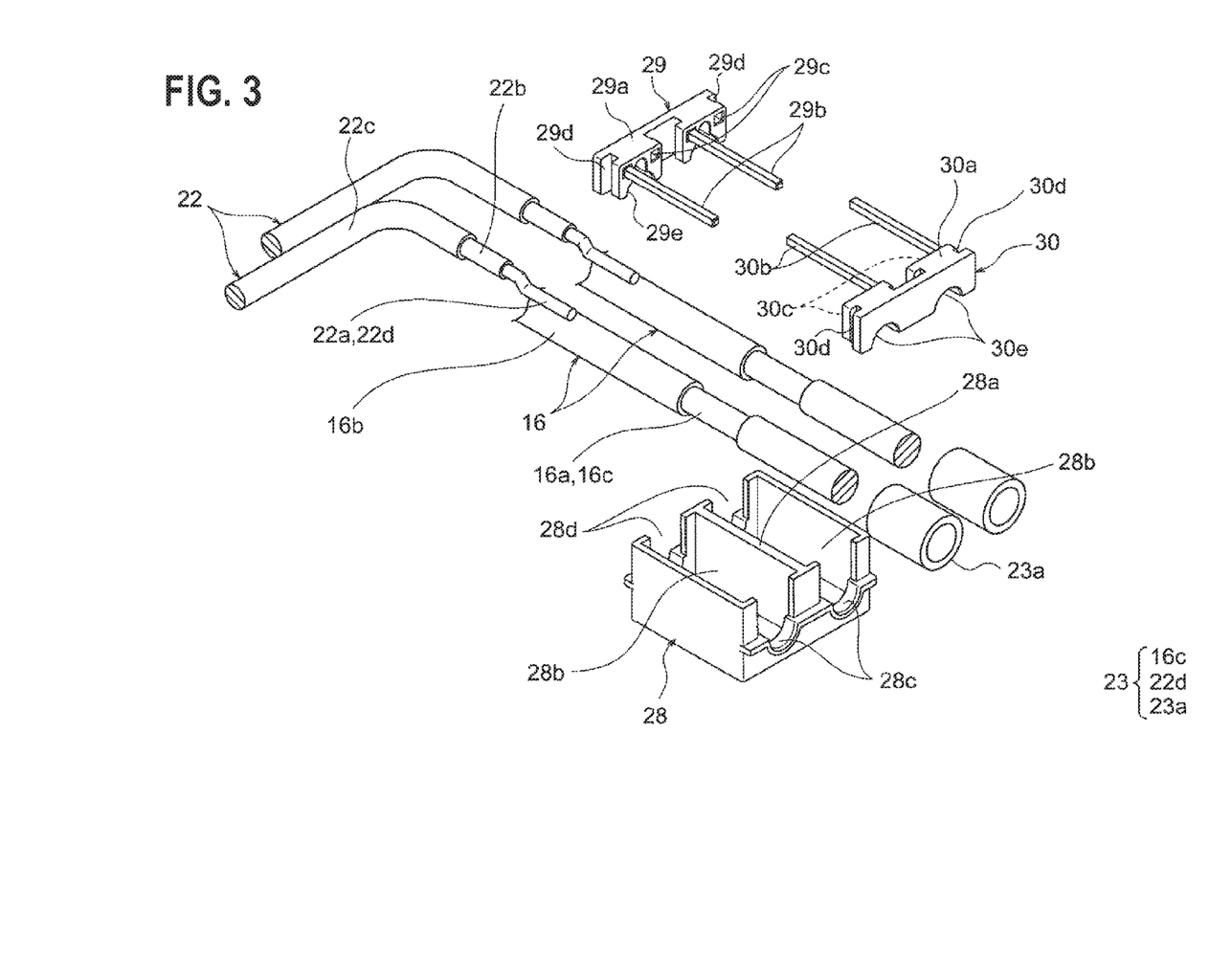
FIG. 3 is an exploded perspective view of branch connecting portions and an insulating and waterproofing portion shown in FIG. 2 (Embodiment 1).
Figure 4:
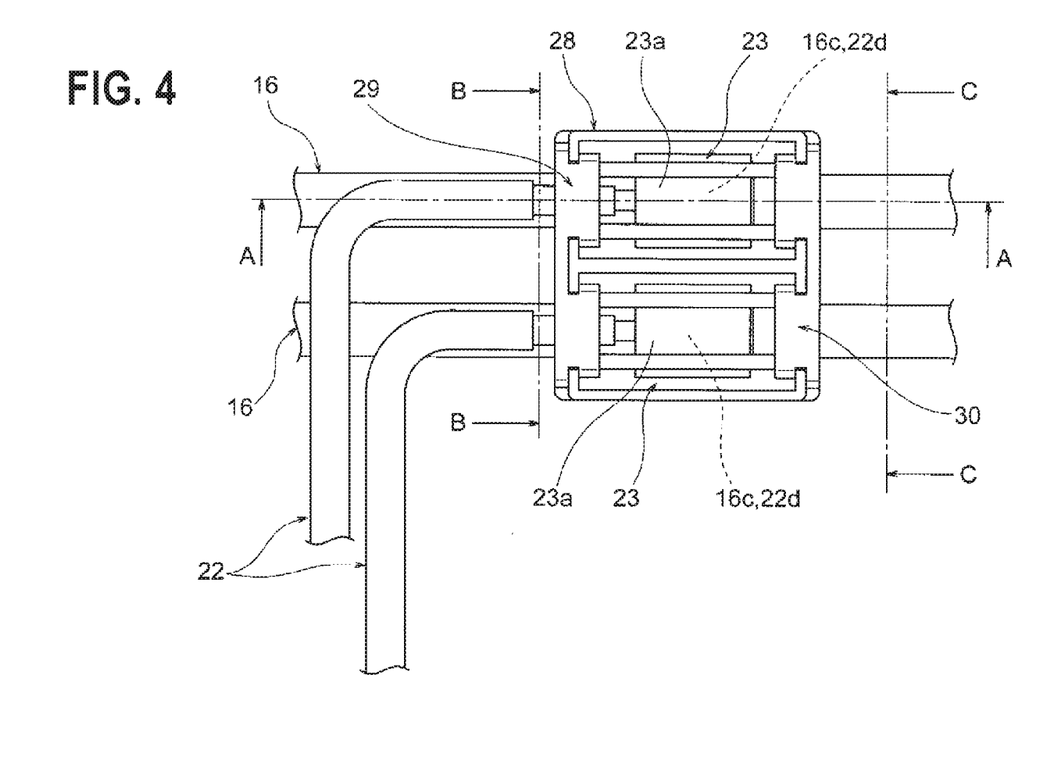
FIG. 4 is a plan view of the branch connecting portions and the insulating and waterproofing portion (before being embedded in a resin mold) (Embodiment 1).
Figure 5A:
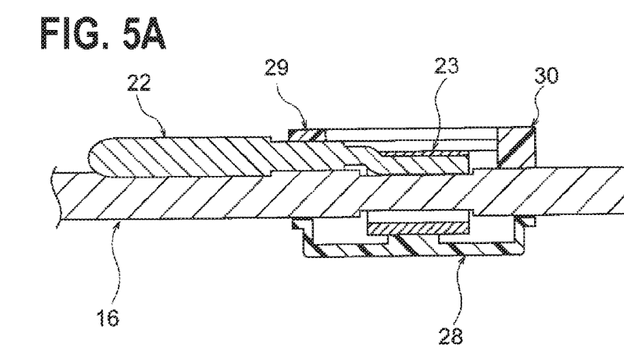
FIG. 5A is a sectional view taken along a line A-A.
Figure 5B:
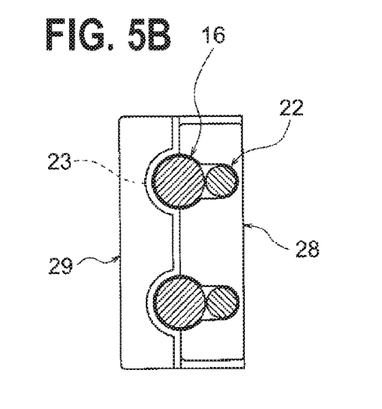
FIG. 5B is a sectional view taken along a line B-B.
Figure 5C:
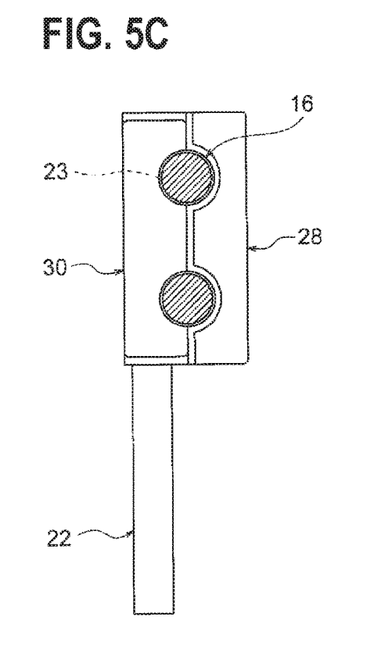
FIG. 5C is a sectional view taken along a line C-C (Embodiment 1).
Figure 6A:
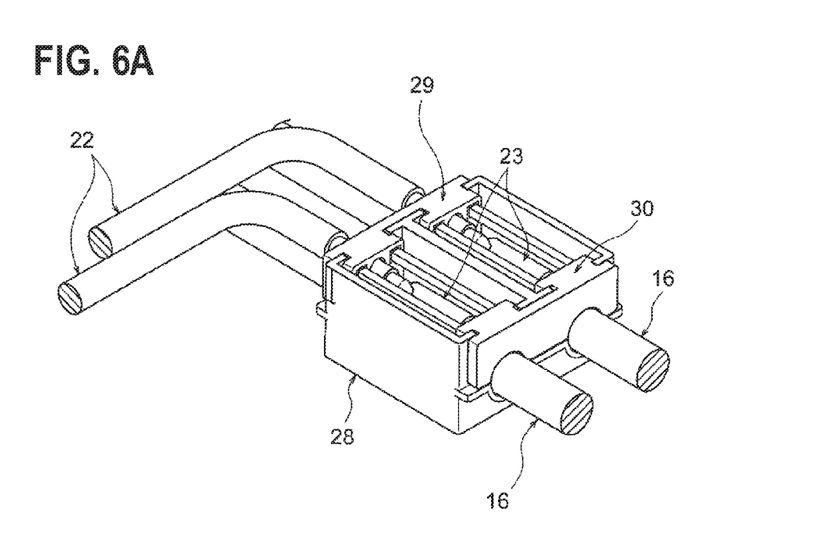
FIG. 6A is a perspective view thereof before the branch connecting portions and the insulating and waterproofing portion are embedded in a resin mold.
Figure 6B:
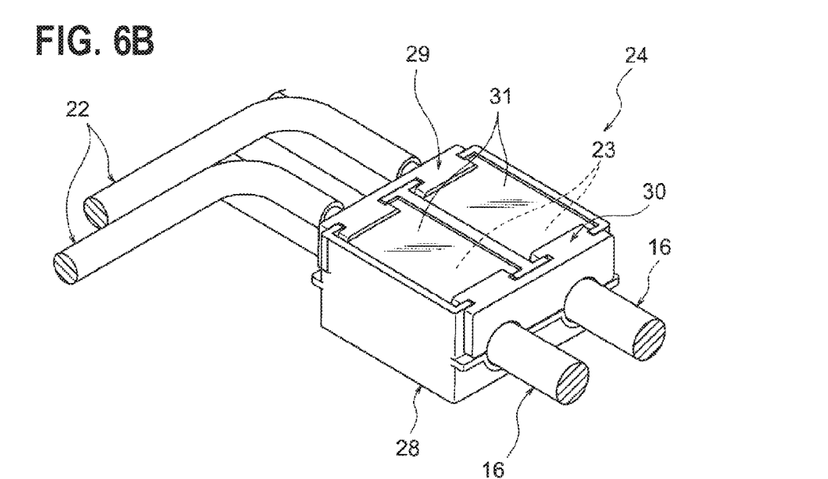
FIG. 6B is a perspective view thereof after the branch connecting portions and the insulating and waterproofing portion are embedded in the resin mold (Embodiment 1).

Hereinafter, referring to the drawings, Embodiment 1 will be described. FIG. 1 is a schematic drawing illustrating a state where a wire harness of the invention is laid out on a vehicle. FIG. 2 is an exploded perspective view of a branching structure main body FIG. 3 is an exploded perspective view of a branch connecting portion and an insulating and waterproofing portion which are shown in FIG. 2, FIG. 4 is a plan view of the branch connecting portion and the insulating and waterproofing portion (before being embedded in a resin mold). FIGS. 5A to 5C show sectional views of FIG. 4, and FIGS. 6A and 6B show perspective views of the branch connecting portion and the insulating and waterproofing portion illustrating states resulting before and after the branch connecting portion and the insulating and waterproofing portions are embedded in the resin mold.

In this embodiment, the invention will be described as being applied to a wire harness which is laid out on a hybrid electric vehicle (or an electric vehicle).

<As to Hybrid Electric Vehicle 1>

In FIG. 1, reference numeral 1 denotes a hybrid electric vehicle. The hybrid electric vehicle 1 is driven by a power source mix of two power sources which are an engine 2 and a motor unit 3. Electric power is supplied from a battery 5 (a battery pack) to the motor unit 3 by way of an inverter unit 4. In this embodiment, the engine 2, the motor unit 3 and the inverter unit 4 are mounted in an engine compartment in a position corresponding longitudinally to front wheels. The battery 5 is mounted at a rear portion 7 of the hybrid electric vehicle 1 in a position corresponding longitudinally to rear wheels (or may be mounted in a passenger compartment of the hybrid electric vehicle in a position lying behind the engine compartment 6).

The motor unit 3 and the inverter unit 4 are connected together by a high-voltage wire harness 8. The battery 5 and the inverter unit 4 are connected together by a high-voltage wire harness 9. A middle portion 10 of the wire harness 9 is laid out along substantially a full length of an outer or lower side of a floor 11 of the hybrid electric vehicle so as to extend substantially parallel to the lower side of the floor 11. The floor is part of a known body and is made up of a so-called panel member. Through holes are formed in predetermined positions in the floor 11. The wire harness 9 is passed through these through holes in a watertight fashion.

The wire harness 9 is connected to the battery 5 via a junction block 12 which is provided on the battery 5. An external connecting device such as a shield connector 14 which is provided a rear harness end 13 of the wire harness 9 electrically connected to the junction block 12. The wire harness 9 and the inverter unit 4 are electrically connected to each other via an external connecting device such as a shield connector 14 which is provided at a front harness end 13 of the wire harness 9.

The motor unit 3 includes a motor and a generator. The inverter unit 4 includes an inverter and a converter. The motor unit 3 is formed as a motor assembly which includes a shield case. In addition, the inverter unit 4 is also formed as an inverter assembly which includes a shield case. The battery 5 is made up of Ni-MH or Li-ion battery modules. An electric charge storing device such as a capacitor can also be used as the battery 5. There is, of course, imposed no specific limitation on the type of the battery 5, provided that a battery to be used on the hybrid electric vehicle 1 or an electric vehicle.

<As to Wire Harness 9>

The wire harness 9, which is long and which is laid out along the full length of the lower side of the floor 11, includes a harness main body 15 and the shield connectors 14 which are provided at both ends of the harness main body 15, that is, at the harness ends 13. Additionally, the wire harness 9 also includes a plurality of fixing members (for example, clamps), which are not shown, with which the wire harness 9 is laid out in a predetermined position and water stopping members (for example, grommets), which are not shown.

<As to Harness Main Body 15>

In FIGS. 1 and 2, the harness main body 15 includes two conductive paths 16, tubular braids 17, 18 which cover the two conductive paths 16, an external member, not shown, which is provided on outer sides of the tubular braids 17, 18, and a branching structure main body 21 which includes a characteristic portion of the invention. The branching structure main body 21 is fixed, for example, to a portion of the body shown in FIG. 1, which is positioned halfway upwards from the floor 11 towards the engine compartment 6 of the hybrid electric vehicle 1.

<As to Conductive Paths 16>

In FIGS. 2 and 3, the conductive paths 16 each include a conductor 16a having the property of conducting electricity and an insulator 16b having the property of prohibiting the passage of electricity which covers the conductor 16a. The conductor 16a is made of copper, copper alloy aluminum or aluminum alloy. In this embodiment, aluminum conductors are adopted since the aluminum conductors are advantageous in cost and weight; the aluminum conductors are inexpensive, and light (the adoption of the aluminum conductors is only an example). As to the construction of the conductor 16a strands may be interlaced into a conductor, or a rod-shaped conductor having a rectangular or circular (round) cross section may be adopted (for example, a conductor made up of a single flat angular core or a single round core is adopted, in which case an electric cable itself has a rod-like shape).

The insulator 16b is formed into a cover having a circular cross section by extruding a thermoplastic resin material around an outer circumferential surface of the conductor 16a. The insulator 16b has a predetermined thickness. Known various types of thermoplastic resins can be used for the thermoplastic resin described above. For example, an appropriate material can be selected among macromolecular materials such as polyvinyl chloride, polyethylene and polypropyleneresin.

<As to Tubular Braids 17, 18>

In FIG. 2, the tubular braids 17, 18 are members for executing electromagnetic shielding. Fine metallic wires are interwoven into a tubular braid. Ends of the tubular braids 17, 18 are fixedly connected to shield shells, not shown, of the front and rear shield connectors 14. (refer to FIG. 1). The other ends of the tubular braids 17, 18 are fixedly connected to a shielding member 26, which will be described later. A metallic foil may be adopted in place of the tubular braids 17, 18.

<As to Branching Structure Main Body 21>

In FIG. 2, the branching structure main body 21 includes the characteristic portion of the invention as described above, in the branching structure main body 21, the conductive paths 16 are used as trunk cables, and branch cables 22 can be connected to halfway portions of the conductive paths 16 which are the trunk cables, in this embodiment, the branch cables 22 are used as wiring for an accessory H for driving an air conditioner. Namely, the branching structure main body 21 constitutes a structure where the wiring for the accessory H for driving the air conditioner braches from a halfway portion of the wire harness 9. Hereinafter, the branching structure main body 21 will be described in a little bit greater detail.

The branching structure main body 21 includes the two branch cables 22, branch connecting portions 23 and an insulating and waterproofing portion 24. In addition, in this embodiment, the branching structure main body 21 includes further a tubular braid 25, a shielding member 26, a protector 27, and a protector cover, not shown.

<As to Brach Cables 22>

In FIGS. 2 and 3, the branch cables 22 each include a conductor 22a having the property of conducting electricity, an insulator 22b having the property of prohibiting the passage of electricity which covers the conductor 22a, and an insulating sheath 22c which covers the insulator 22b. Although the aluminum conductor 16a is used in the conductive path 16 which is the trunk cable, aluminum is not used for the conductor 22a. In this embodiment, a copper or copper alloy conductor which is not the same material is adopted (the adoption of the copper or copper alloy conductor is only an example).

The insulator 22b and the sheath 22c are formed as covers having a circular cross section by extruding a thermoplastic resin materials along an outer circumferential surface of the conductor 22a and an outer circumferential surface of the insulator 22b, respectively. The insulator 22b and the sheath 22c have predetermined thicknesses. Known various types of thermoplastic resins can be used for the thermoplastic resin described above. For example, an appropriate material can be selected among macromolecular materials such as polyvinyl chloride, polyethylene and polypropylene resin.

<Branch Connecting Portions 23>

In FIGS. 2 and 3, the branch connecting portions 23 are each formed by, firstly, forming a trunk cable-side conductor exposed portion 16c and a branch cable-side conductor exposed portion 22d and following this, electrically connecting the trunk cable-side conductor exposed portion 16c to the branch cable-side conductor exposed portion 22d. The trunk cable-side conductor exposed portion 16c is formed by removing the insulator 16b over an appropriate length in a predetermined halfway position on each of the conductive paths 16 which are the trunk cable and exposing the conductor 16a. On the other hand, the branch cable-side conductor exposed portion 22d is formed by removing the insulator 22b and the sheath 22c over an appropriate length at an end of the branch cables 22 and exposing the conductor 16a.

In electrically connecting the trunk cable-side conductor exposed portion 16c and the branch cable-side conductor exposed portion 22d, a process is adopted in which firstly the branch cable-side conductor exposed portion 22d is soldered to the corresponding trunk cable-side conductor exposed portion 16c, whereafter the trunk cable-side conductor exposed portion 16c and the branch cable-side conductor exposed portion 22d are clamped together by a metallic joint terminal 23a (refer to FIGS. 4 and 5A). (This process is only an example. For example, an appropriate joining technique such as welding may be adopted.)

<As to Insulating and Waterproofing Portion 24>

In FIGS. 2 to 6B, the insulating and waterproofing portion 24 is formed so as to insulate and waterproof the branch connecting portions 23. Namely the insulating and waterproofing portion 24 functions as a portion which insulates and waterproofs the branch connecting portions 23. In this embodiment, the insulating and waterproofing portion 24 includes a case 28, wire holders 29, 30, and resin mold portions 31 (resin molds) and is formed into a shape shown in the drawings.

<As to Case 28>

In FIGS. 2 and 3, the case 28 is a resin molded part having the property of prohibiting the passage of electricity and is formed into a rectangular parallelepiped box which is opened at a top thereof. In the case 28 configured in this way a reference numeral 28a denotes a bulkhead. The case 28 is divided into two accommodating portions 28b by this bulkhead 28a. Additionally, reference numerals 28c, 28d denote conductive path exit or drawing-out portions. The conductive path drawing-out portions 28c are each cut out substantially into a U-shape so that the conductive path 16 can be drawn out from the accommodating portion 28b therethrough. Similarly, the conductive path drawing-out portions 28d are each cut, out substantially into a U-shape so that the conductive path 16 and the branch cable 22 can be drawn out from the accommodating portion 28b therethrough. The conductive path drawing-out portions 28c, 28d are formed so as to function as guiding projecting portions for the wire holders 29, 30.

<As to Wire Holders 29, 30>

In FIGS. 2 to 4, the wire holders 29, 30 are formed from the same resin material from which the case 28 is formed and have holder main bodies 29a, 30a and pairs of rod-shaped portions 29b, 30b protruding from the holder main bodies 29a, 30a. The wire holders 29, 30 have shapes shown in the drawings. The holder main bodies 29a, 30a have pairs of rod inserting portions 29c, 30c into which distal ends of the mating rod-shaped portions 29b, 30b are inserted, pairs of guide recess portions 29d, 30d which are guided on the conductive path drawing-out portions 28c, 28d of the case 28, and pairs of substantially semi-circular conductive path drawing-out portions 29e, 30e.

<As to Resin Mold Portions 31>

In FIG. 6B, the resin mold portions 31 are formed as portions configured to fill gaps produced around the circumferences of the branch connecting portions 23 which are accommodated in the case 28 and are held by the wire holders 29, 30 in a watertight fashion. In this embodiment, the resin mold portions 31 are formed as functional portions like sealing members. The resin mold portions 31 are formed by filling the spaces with a silicone resin and letting the silicone resin set (the material is not limited to the silicone resin, and hence, for example, an epoxy resin may be used).

Forming the insulating and waterproofing portion 24 by filling and setting the silicone resin to form the resin mold portions 31 completes the insulating and waterproofing process of the branch connecting portions 23.

<As to Tubular Braid 25>

In FIG. 2, as with the braids 17, 18 described above, the tubular braid 25 is a member for executing electromagnetic shielding. Fine metallic wires are interwoven into a tubular braid. The tubular braid 25 is formed so as to cover the two branch lines 22 altogether. An end portion of the tubular braid 25 is fixedly connected to the shielding member 26. A metallic foil may be used in place of the tubular braid 25.

<As to Shielding Member 26>

In FIG. 2, the shielding member 26 is a conductive metallic member and is formed so as to cover the insulating and waterproofing portion 24 to thereby execute electromagnetic shielding. Although not shown specifically, the shielding member 26 may be constructed so that part of the shielding member 26 penetrates the protector 27, which will be described later, so as to be brought into contact with the body of the hybrid electric vehicle.

<As to Protector 27 and Protector Cover, not Shown>

In FIG. 2, the protector 27 is a resin molded part and has a shape which can accommodate therein the insulating and waterproofing portion 24 which is covered by the shielding member 26. A fixing portion, not shown, is formed on the protector 27 for fixing the branching structure main body 21 in a predetermined position. On the other hand, the protector cover, not shown, is formed so as to cover an opening portion of the protector 27 which accommodates the insulating and waterproofing portion 24.

<Summary and Advantageous Effects of Wire Harness 9>

Thus, as has been described while referring to FIGS. 2 to 6B, in the wire harness 9 according to this embodiment, the conductive paths 16 are used as the trunk cables, and the branch cables 22 are connected to the halfway portions of the conductive paths 16 which are the trunk cables. Specifically speaking, the wire harness 9 has the branching structure main body 21. In the branching structure main body 21, the insulating and waterproofing portion 24 is provided on the connecting portions (the branch connecting portions 23) where the conductive paths 16, which are the trunk cables, are connected to the corresponding branch cables 22, whereby the connecting portions are insulated and waterproofed. Therefore, even with the high-voltage wire harness 9, there is caused no problem in relation to the branching of the branch cables 22 from the trunk cables 16. In addition, in the insulating and waterproofing portion 24, the part of the insulating and waterproofing portion 24 is formed of the resin mold portions 31, and therefore, the branch connecting portions 23 are embedded in the resin mold portions 31, as a result of which the insulating and waterproofing properties are, of course, improved.

In addition to the advantageous effect described above, according to the wire harness 9 of the invention, the shielding member 26 is provided, and therefore, the insulating and waterproofing portion 24 can be covered by the shielding member 26, whereby the conductive paths 16 and the branch cables 22 inside the insulating and waterproofing portion 24 can electromagnetically be shielded. In addition, the protector 27 is provided, and therefore, the insulating and waterproofing portion 24 which is covered by the shielding member 26 is accommodated in the protector 27 so as to be protected externally. Further, even though the wire harness 9 has the branching portion, the protector 27 is provided to protect the branching portion, thereby making it easy for the wire harness 9 to be laid out on the body of the hybrid electric vehicle 1.

Consequently according to the wire harness 9 of the invention, there is provided an advantageous effect that not only can the working performance in connecting devices (accessories) together be improved, but also the cost involved in producing the wire harness 9 can be reduced. In addition, by providing the wire harness 9 of the invention, there is provided an advantageous effect that not only can devices (accessories) at the harness ends 13 electrically be connected but also a further device (accessory) can electrically be connected.

Embodiment 2

Figure 7:
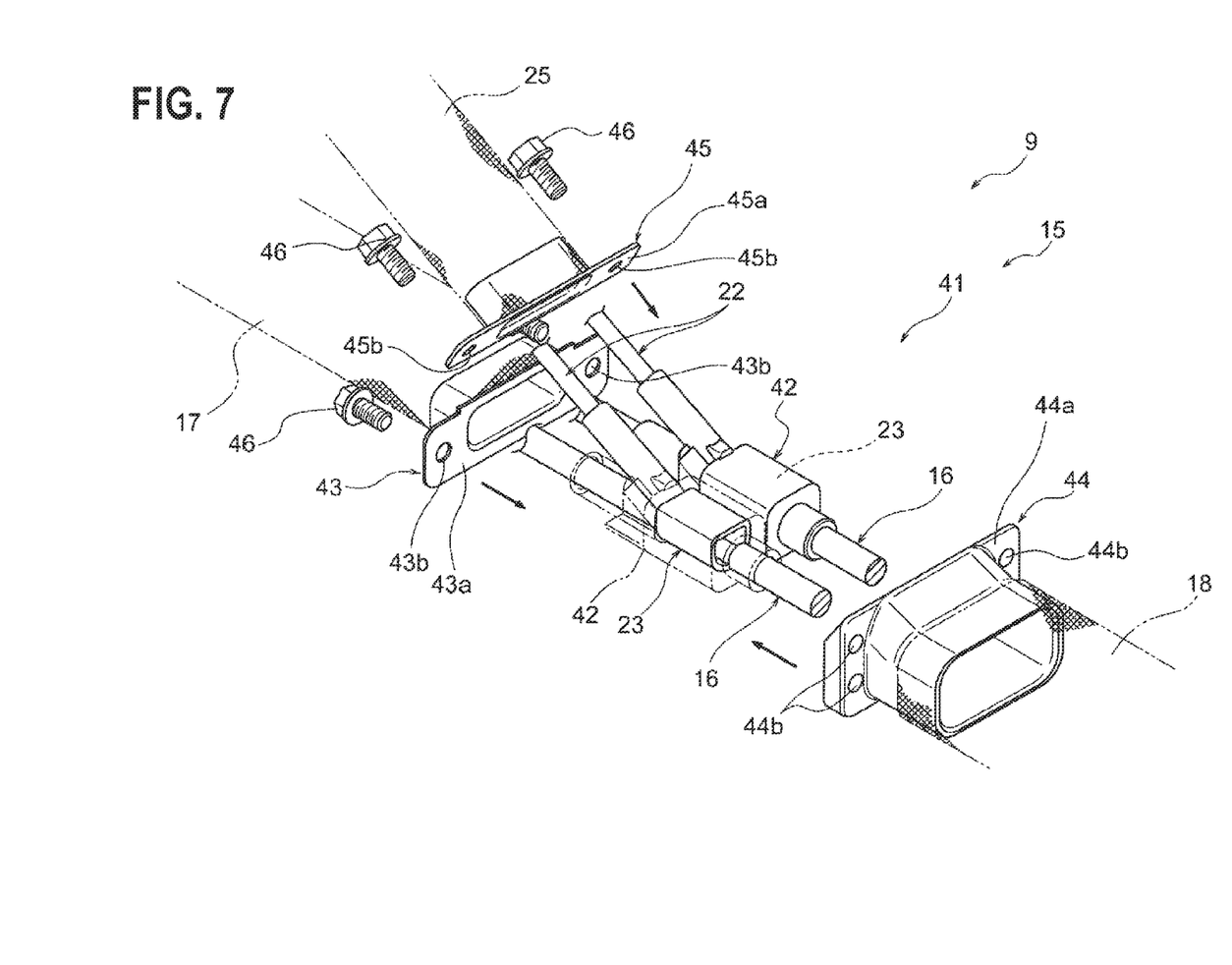
FIG. 7 is an exploded perspective view showing a branching structure main body of the wire harness according to another embodiment (Embodiment 2).
Figure 8:
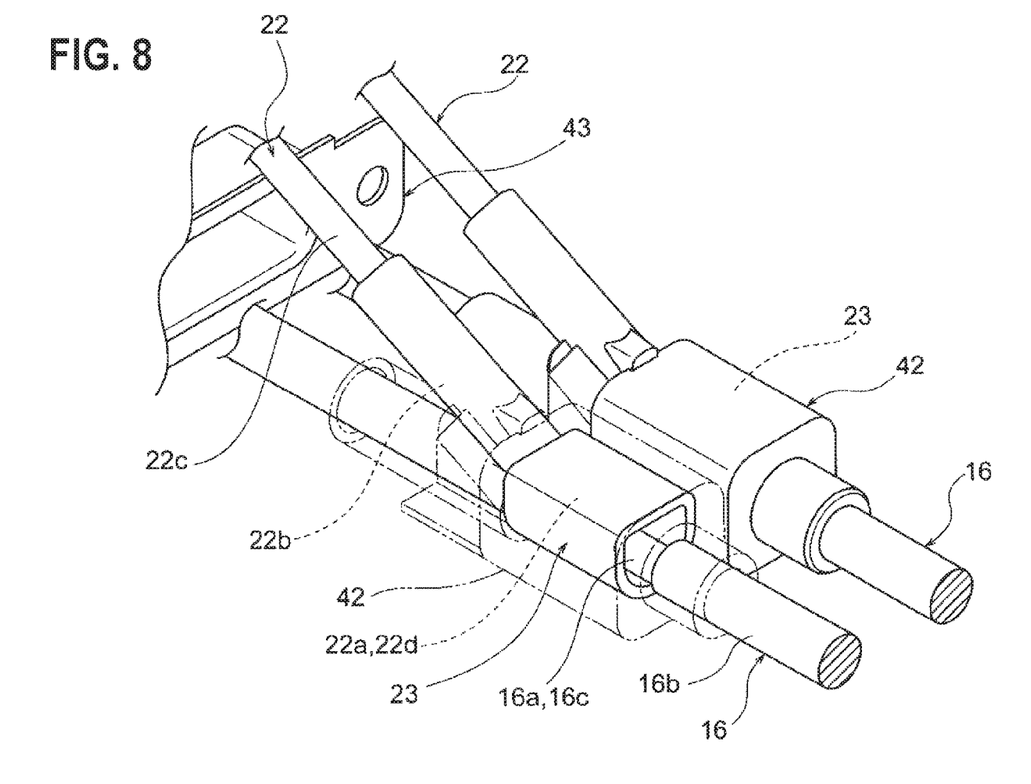
FIG. 8 is a perspective view of branch connecting portions and an insulating and waterproofing portion shown in FIG. 7 (Embodiment 2).
Figure 9A:
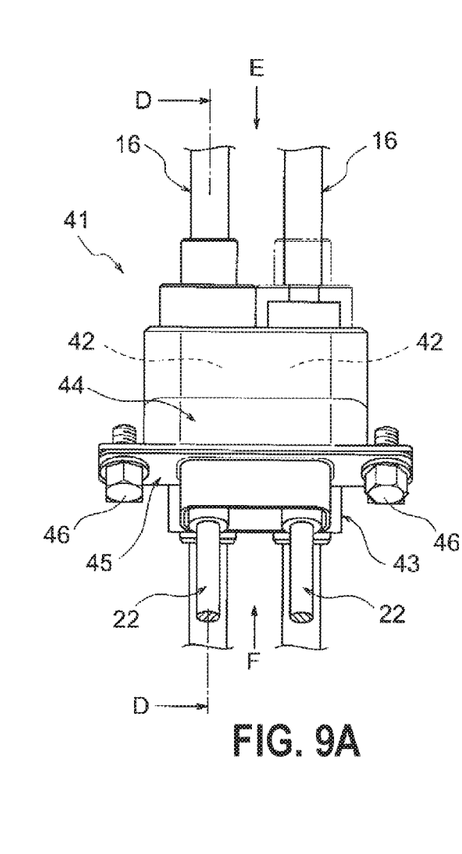
FIG. 9A is a plan view.
Figure 9B:
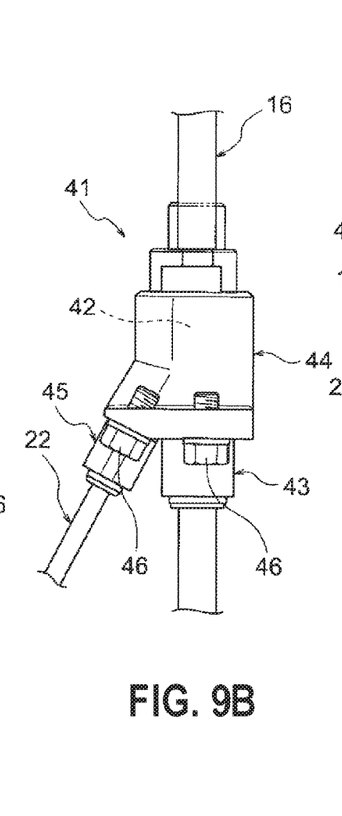
FIG. 9B is a side view.
Figure 9C:
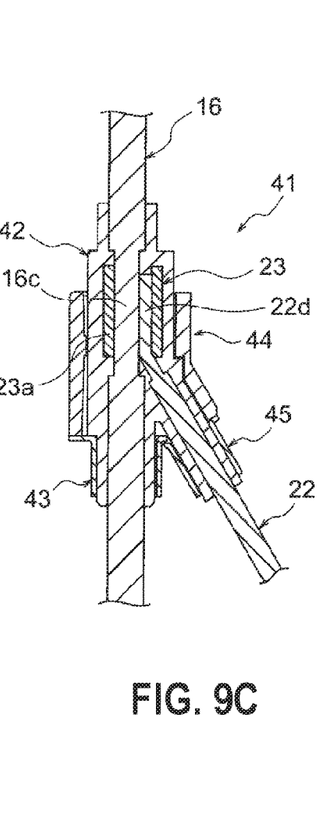
FIG. 9C is a sectional view taken along a line D-D in FIG. 9A (Embodiment 2).
Figures 10A, 10B, 10C:
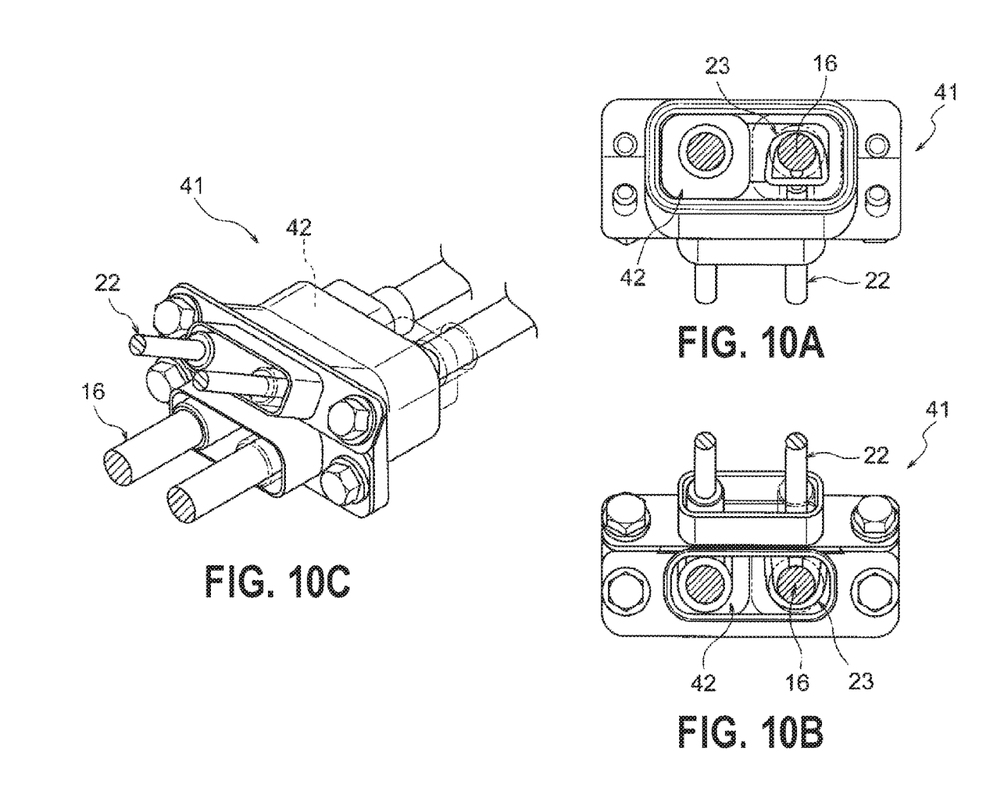
FIG. 10A is a view resulting when the branch connecting portions and the insulating and waterproofing portion are seen in a direction denoted by an arrow E in FIG. 9A.
FIG. 10B is a view resulting when the branch connecting portions and the insulating and waterproofing portion are seen in a direction denoted by an arrow F in FIG. 9A.
FIG. 10C is a perspective view of the branch connecting portions and the insulating and waterproofing portion (Embodiment 2).

Hereinafter, referring to the drawings, Embodiment 2 will be described, FIG. 7 is an exploded perspective view showing a branching structure main body of a wire harness according to another embodiment. FIG. 8 is a perspective view of branch connecting portions and an insulating and waterproofing portion shown in FIG. 7. FIGS. 9A to 10C are plan views and perspective views of the branch connecting portions and the insulating and waterproofing portion.

<As to Wire Harness 9 and Harness Main Body 15>

A wire harness 9 includes a harness main body 15 and shield connectors 14 (refer to FIG. 1) which is provided at both ends of the harness main body 15. The harness main body 15 includes two conductive paths 16, tubular braids 17, 18 which cover the two conductive paths 16, an external member, not shown, which are provided on outer sides of the tubular braids 17, 18 and a branching structure main body 41 which includes a characteristic portion of the invention. The branching structure main body 41 is disposed and fixed in the same position as that of Embodiment 1.

<As to Conductive Paths 16>

In FIGS. 7 and 8, as with the conductive paths 16 of Embodiment 1, the conductive paths 16 each include a conductor 16a having the property of conducting electricity and an insulator 16b having the property of prohibiting the passage of electricity which covers the conductor 16a.

<As to Tubular Braids 17, 18>

In FIG. 7, as with the tubular braids 17, 18 of Embodiment 1, the tubular braids 17, 18 are members for executing electromagnetic shielding. Fine metallic wires are interwoven into a tubular braid. The tubular braids 17, 18 are connected and fixed to shielding members 43, 44, 45, which will be described later, at the other ends thereof. A metallic foil may be used in place of the tubular braids 17, 18.

<As to Branching Structure Main Body 41>

In FIG. 7, the branching structure main body 41 is constructed so that branch cables 22 can be connected to halfway portions of the conductive paths 10 which are the trunk cables. As with Embodiment 1, the branch cables 22 are used as wiring for an accessory 14 (refer to FIG. 1) which drives an air conditioner. The branching structure main body 41 includes the two branch cables 22, branch connecting portions 23, insulating and waterproofing portions 42, a tubular braid 25, the shielding members 43, 44, 45, and a protector and a protector cover which are not shown.

<As to Brach Cables 22, Branch Connecting Portions 23 and Tubular Braid 25>

In FIGS. 7 and 8, the branch cables 22, the branch connecting portions 23 and the tubular braid 25 are the same as those of Embodiment 1 and are formed in the same states as those of Embodiment 1.

<As to Insulating and Waterproofing Portions 42>

In FIGS. 7 to 9C, the insulating and waterproofing portions 42 are formed so as to insulate and waterproof individually the branch connecting portions 23. Namely, the insulating and waterproofing portions 42 function as portions which insulate and waterproof individually the branch connecting portions 23. In this embodiment, the insulating and waterproofing portions 42 are formed through resin molding into, for example, a shape shown in the drawings (the shape is only an example, and the insulating and waterproofing portions 42 may be molded as a single unit). In forming (resin molding) the insulating and waterproofing portions 42, an angle at which the two branch cables 22 are drawn out of the insulating and waterproofing portions 42 or the branch connecting portions 23 is set as required.

<As to Shielding Members 43, 44, 45>

In FIGS. 7, 9A to 10C, the shielding members 43, 44, 45 are conductive metallic members and are formed so as to cover individually the insulating and waterproofing portions 42 for execution of electromagnetic shielding. In this embodiment, the shielding members 43, 44, 45 are so-called shield shells and have a substantially tubular shape.

The shielding members 43, 44, 45 have flange portions 43a, 44a, 45a. Threaded holes 43b, 44b, 45b are formed in the flange portions 43a, 44a, 45a, respectively. Although not shown specifically, a waterproof packing is provided on each of the flange portions 43a, 44a, 45a. The shielding members 43, 44, 45 are assembled together into a configuration shown in the drawings by being tightened together with screws or threaded bolts 46.

<Summary and Advantageous Effects of Wire Harness 9>

Thus, as has been described while referring to FIGS. 7 to 10C, in the wire harness 9 according to this embodiment, the conductive paths 16 are used as the trunk cables, and the branch cables 22 are connected to the halfway portions of the conductive paths 16 which are the trunk cables. Specifically speaking, the wire harness 9 has the branching structure main body 41. In the branching structure main body 41, the insulating and waterproofing portions 42 are provided on the connecting portions (the branch connecting portions 23) where the corresponding branch cables 22 are connected to the conductive paths 16, which are the trunk cables, whereby the connecting portions are insulated and waterproofed. Therefore, even with the high-voltage wire harness 9, there is caused no problem in relation to the branching of the branch cables 22 from the trunk cables 16. In addition, in the insulating and waterproofing portions 42, the insulating and waterproofing portions 42 are wholly formed through resin molding, whereby the branch connecting portions 23 are embedded in set resin molds, as a result of which the insulating and waterproofing properties are, of course, ensured sufficiently.

In addition, according to the wire harness 9 of this embodiment, the shielding members 43, 44, 45 are provided so as to cover the insulating and waterproofing portions 42, and therefore, electromagnetic shielding can be executed on the insulating and waterproofing portions 42. Additionally, the protector, not shown, is provided, and therefore, the insulating and waterproofing portions 42 which are covered by the shielding members 43, 44, 45 can be accommodated in the protector to thereby be protected externally. Further, the protector, not shown, is provided, and therefore, even though the wire harness 9 has the branching portion, the wire harness 9 can easily be laid out on the body of the hybrid electric vehicle 1.

Consequently the wire harness 9 of Embodiment 2 provides the same advantageous effect as that provided by Embodiment 1. Namely, there is provided an advantageous effect that not only can the working performance in connecting devices (accessories) together be improved but also the cost involved in producing the wire harness 9 can be reduced.

In addition, the invention can, of course, be carried out variously without departing from the spirit and scope of the invention.

DESCRIPTION OF REFERENCE NUMERALS

1: hybrid electric vehicle
2: engine
3: motor unit
4: inverter unit
5: battery
6: engine compartment
7: rear portion of hybrid electric vehicle
8, 9: wire harness
10: middle portion
11: floor of hybrid electric vehicle
12: junction block
13: harness end
14: shield connector
15: harness main body
16: conductive path (trunk cable)
17, 18: tubular braid
21: branching structure main body
22: branch cable
23: branch connecting portion
24: insulating and waterproofing portion
25: tubular braid
26: shielding member
27: protector
28: case
29, 30: wire holder
31: resin mold portion (resin mold)
41: branching structure main body
42: insulating and waterproofing portion
43, 44, 45: shielding member
46: screw or threaded bolt

What is claimed is:

1. A wire harness which electrically connects high-voltage devices comprising:
a conductive path that is used as a trunk cable;
a branch cable that branches from the trunk cable; and
a branch connecting portion which connects the trunk cable with the branch cable,
wherein the trunk cable has a trunk cable-side conductor exposed portion where a cover of the trunk cable lying in a predetermined position of the trunk cable is removed,
the branch cable has a branch cable-side conductor exposed portion where a cover of the branch cable lying a predetermined position of the branch cable is removed,
the trunk cable-side conductor exposed portion is connected with the branch cable-side conductor exposed portion at the branch connecting portion, and
the branch connecting portion has an insulating and waterproofing portion which functions as an insulating portion and a waterproofing portion,
wherein the insulating and waterproofing portion is configured to fill spaces around circumferences of the branch connecting portion with resin in a watertight fashion and setting the resin such that the branch connecting portion is embedded in set resin molds forming the insulating and waterproofing portion.

2. A wire harness which electrically connects high-voltage devices comprising:
a conductive path that is used as a trunk cable;
a branch cable that branches from the trunk cable;
a branch connecting portion which connects the trunk cable with the branch cable; and
a shielding member,
wherein the trunk cable has a trunk cable-side conductor exposed portion where a cover of the trunk cable lying in a predetermined position of the trunk cable is removed,
the branch cable has a branch cable-side conductor exposed portion where a cover of the branch cable lying a predetermined position of the branch cable is removed,
the trunk cable-side conductor exposed portion is connected with the branch cable-side conductor exposed portion at the branch connecting portion,
the branch connecting portion has an insulating and waterproofing portion which functions as an insulating portion and a waterproofing portion, and
the shielding member covers the insulating and waterproofing portion to shield the insulating and waterproofing portion.

3. The wire harness according to claim 2 further comprising a protector that accommodates therein the insulating and waterproofing portion which is covered by the shielding member.

4. The wire harness according to claim 1, wherein a part of the insulating and waterproofing portion is formed of a resin mold.

5. The wire harness according to claim 2, wherein a part of the insulating and waterproofing portion is formed of a resin mold.

6. The wire harness according to claim 3, wherein a part of the insulating and waterproofing portion is formed of a resin mold.

7. The wire harness according to claim 1, wherein a whole of the insulating and waterproofing portion is formed of a resin mold.

8. The wire harness according to claim 2, wherein a whole of the insulating and waterproofing portion is formed of a resin mold.

9. The wire harness according to claim 3, wherein a whole of the insulating and waterproofing portion is formed of a resin mold.

* * * * *